United States Patent [19]

Lund et al.

[11] Patent Number: 5,908,714
[45] Date of Patent: Jun. 1, 1999

[54] METHOD OF MAKING LEAD-ACID CELL-TO-CELL CONNECTIONS AND THE RESULTING BATTERY

[75] Inventors: David L. Lund, Minneapolis; Thomas E. Lawrence, Inver Grove Heights; William H. Kump, St. Paul, all of Minn.

[73] Assignee: GNB Technologies, Inc., Mendota Heights, Minn.

[21] Appl. No.: 08/902,839

[22] Filed: Jul. 30, 1997

[51] Int. Cl.$^6$ ...................................................... H02M 2/24
[52] U.S. Cl. ................................................................ 429/158
[58] Field of Search ................................. 29/623.4, 623.1; 429/158, 160, 159

[56] References Cited

U.S. PATENT DOCUMENTS

| | | | |
|---|---|---|---|
| 1,315,135 | 9/1919 | LaRocco . | |
| 2,052,081 | 8/1936 | Campbell | 173/259 |
| 2,274,437 | 2/1942 | St. George | 173/259 |
| 2,278,307 | 3/1942 | Eisler, Jr. | 173/259 |
| 3,908,738 | 9/1975 | Bruzas et al. | 164/80 |
| 3,908,739 | 9/1975 | Cushman | 164/80 |
| 3,908,743 | 9/1975 | Schenk, Jr. et al. | 164/80 |
| 3,909,301 | 9/1975 | Schenk, Jr. et al. | 136/134 R |
| 3,956,576 | 5/1976 | Jensen et al. | 174/138 F |
| 4,206,273 | 6/1980 | Mandil | 429/65 |
| 4,455,356 | 6/1984 | Barrett, Jr. | 429/66 |
| 4,485,959 | 12/1984 | Orlando et al. | 228/102 |
| 4,562,125 | 12/1985 | Davis | 429/65 |
| 4,761,354 | 8/1988 | Poe et al. | 429/121 |
| 5,015,543 | 5/1991 | English | 429/65 |
| 5,023,154 | 6/1991 | English | 429/182 |
| 5,236,792 | 8/1993 | Larkin et al. | 429/121 |
| 5,525,438 | 6/1996 | Kostrivas et al. | 429/87 |

*Primary Examiner*—John S. Maples
*Attorney, Agent, or Firm*—Leydig, Voit & Mayer

[57] ABSTRACT

A method of making lead-acid cell-to-cell or battery-to-battery connections is disclosed which utilizes a non-conductive capture mold, made, for example, from polypropylene polymers, which capture mold has a base having holes allowing the capture mold to be placed over adjacent terminal posts of like polarity and upstanding walls having a height equal to that of the terminal posts, the capture mold serving to retain the lead alloy connector in place while the cell or battery connection is made, as by induction heating or the like.

7 Claims, 4 Drawing Sheets

METHOD OF MAKING LEAD-ACID CELL-TO-CELL CONNECTIONS AND THE RESULTING BATTERY

FIELD OF THE INVENTION

This invention relates to lead-acid cells and batteries and, more particularly, to a method of making the cell-to-cell electrical connections and to the resulting battery.

BACKGROUND OF THE INVENTION

A wide variety of applications require an array of cells electrically connected together to provide a battery system having the requisite electrical performance characteristics. Such applications, sometimes termed industrial battery applications, include stationary battery applications in which the cells and batteries, typically lead-acid cells and batteries, provide stand-by power in the event of a power failure. For this type of application, such cells and the resulting batteries are maintained at a full state-of-charge and in a ready-to-use condition, typically by floating at a constant preset voltage. Stationary batteries are used for stand-by or operational power in a wide variety of applications, including, by way of illustration, telecommunications, utilities, for emergency lighting in commercial buildings, as stand-by power for cable television systems, and in uninterruptible power supplies for computer back-up power and the like.

Other industrial battery applications in which lead-acid cells and batteries may be used involve a variety of motive power applications in which an array of cells or batteries provides the motive power for vehicles ranging from Class 1 to Class 3 trucks, various automated guided vehicles, mining vehicles, and also railroad locomotives.

The electrical performance requirements dictate that the array of cells which must be electrically connected together be tailored to the specific application. Thus, for example, the number of cells involved may vary from 6 or 12 up to over 100 or more. Such cells can be electrically connected in series, in parallel, or in both, depending upon the particular requirements of the application.

Fundamental to the process of using lead-acid cells for such industrial battery applications is the necessity of making efficient cell-to-cell electrical connections, i.e., connecting the terminals of adjacent cells. Typically, a pre-cast lead connector is manually placed over the terminal posts in adjacent cells which are to be electrically connected. Some form of a mold is then manually placed in position, and then the connection is made by fusion with a gas torch or by other means, such as by induction heating or the like. The molds are then manually removed and an insulating plastic shroud is placed over the connectors for aesthetic and safety reasons.

As may be appreciated, this method of making the cell-to-cell connection is extremely labor intensive and is not amenable to continuous or even semi-continuous processing. Moreover, extreme care must be taken to at least minimize molten lead leaks, run-downs and the like while the connection is being made. More particularly, fusion to provide the satisfactory post-to-connector electrical connection requires the parts being fused to have their respective surfaces be adequately molten so that appropriate fusion takes place; yet, current methods, as far as can be ascertained, make it difficult to maintain the molten lead in place and to avoid molten lead leaking down onto the cells.

There thus exists the need for a more efficient method of making the required cell-to-cell electrical connections. Given the relatively large number of such connections which are required, tailored to the particular application, the need is clear and is substantial.

It is accordingly an object of the present invention to provide a more effective and efficient method for making the cell-to-cell connections for lead-acid cells and batteries.

Another object of this invention provides a method for making such cell-to-cell connections which is more amenable to automation.

Yet another object of this invention lies in the provision of a method which minimizes the likelihood of leaks and the like resulting from effecting the necessary post-to-connector operation.

A still further object of this invention in a more preferred embodiment is to provide a method which avoids the need for separately providing an insulating plastic shroud.

Other objects and advantages of the present invention will be apparent as the following description proceeds.

SUMMARY OF THE INVENTION

Pursuant to the general aspects of the present invention, it has been found that a plastic mold can be employed as a capture mold for the lead mass needed to make the cell-to-cell connection, such that the mold can be kept in place, becoming a part of the assembled battery system. In the more preferred embodiment of this invention, the plastic mold can be provided with a cover such that, after the necessary post-to-connector fusion has taken place, the cover can be closed to provide a plastic shroud over the thus-fashioned cell-to-cell connection. What is particularly surprising is that, when a conventional lead-acid container plastic material is used for the capture mold, the mold functions satisfactorily to retain the molten connector material (e.g., a conventional lead-based alloy) in place even though the temperature of the molten connector material may be hundreds of degrees above the melting point of the plastic material.

DETAILED DESCRIPTION OF THE INVENTION

Figure 1:
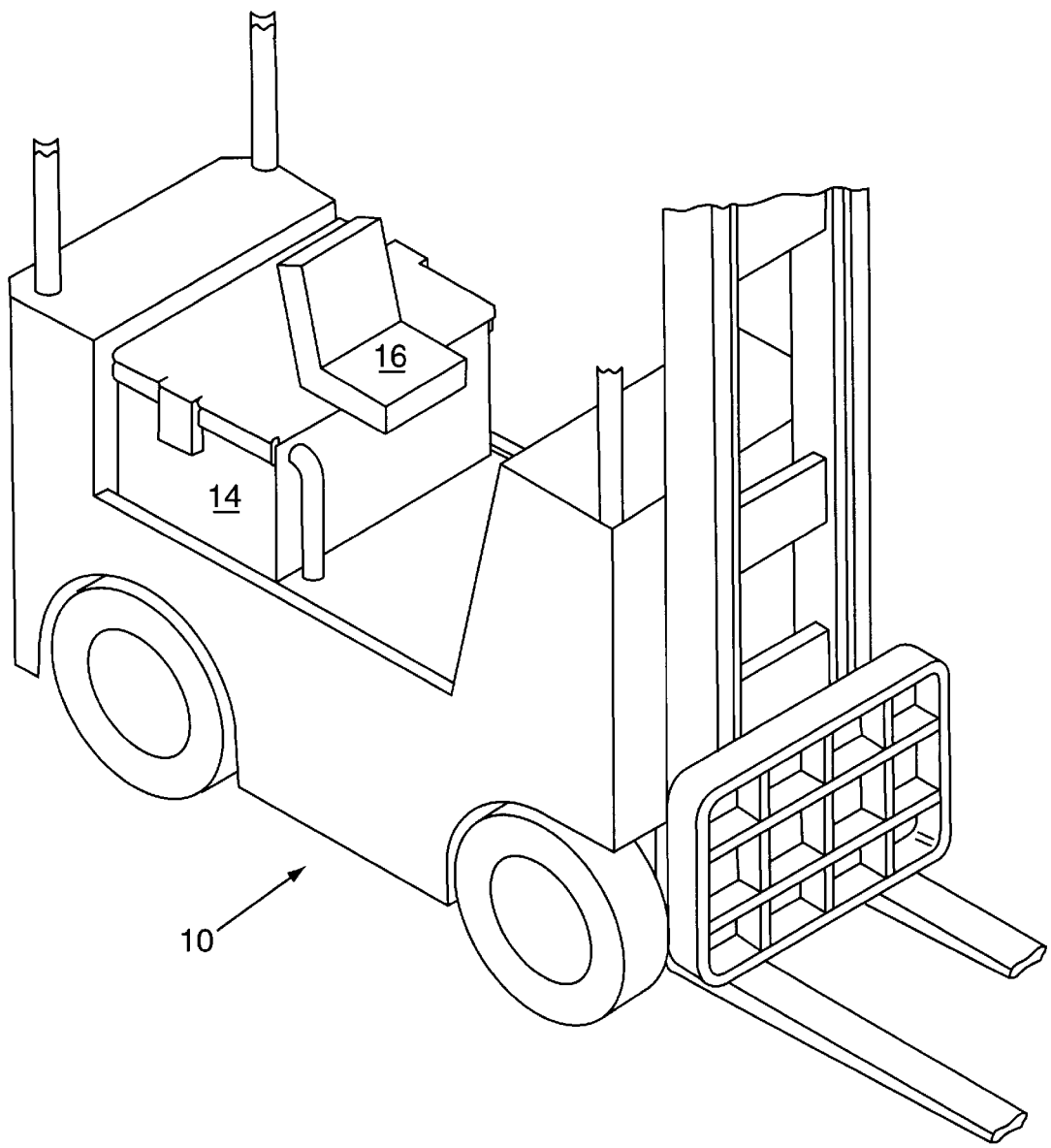
FIG. 1 is a partial isometric view illustrating an electrical rider truck utilizing the battery of the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but, on the contrary, the intention is to cover all modifications, alternative constructions and equivalents falling within the spirit and scope of the invention.

Thus, while the present invention is illustrated and described as being utilized with an electric rider truck, it should be appreciated that this is merely one example of a service application where the present invention is desirably used. The present invention thus finds utility in any industrial battery application, whether the application be classed as a stationary or a motive power application. Indeed, as may be appreciated, the present invention can be used in any application where a plurality of cells or batteries need to be electrically connected together by fusion techniques or the like.

Further, the particular configuration of the various components of the batteries do not form a part of the present invention. The types of lead-acid cells and batteries used in stationary and motive power applications are well known. Both conventional, flooded electrolyte lead-acid cells and batteries are used, as are sealed, valve-regulated lead-acid cells and batteries (sometimes termed "VRLA" cells). Of course, the present invention may be used with any other type of cell or battery where fused post terminal-to-connector connections are utilized.

Figure 2:
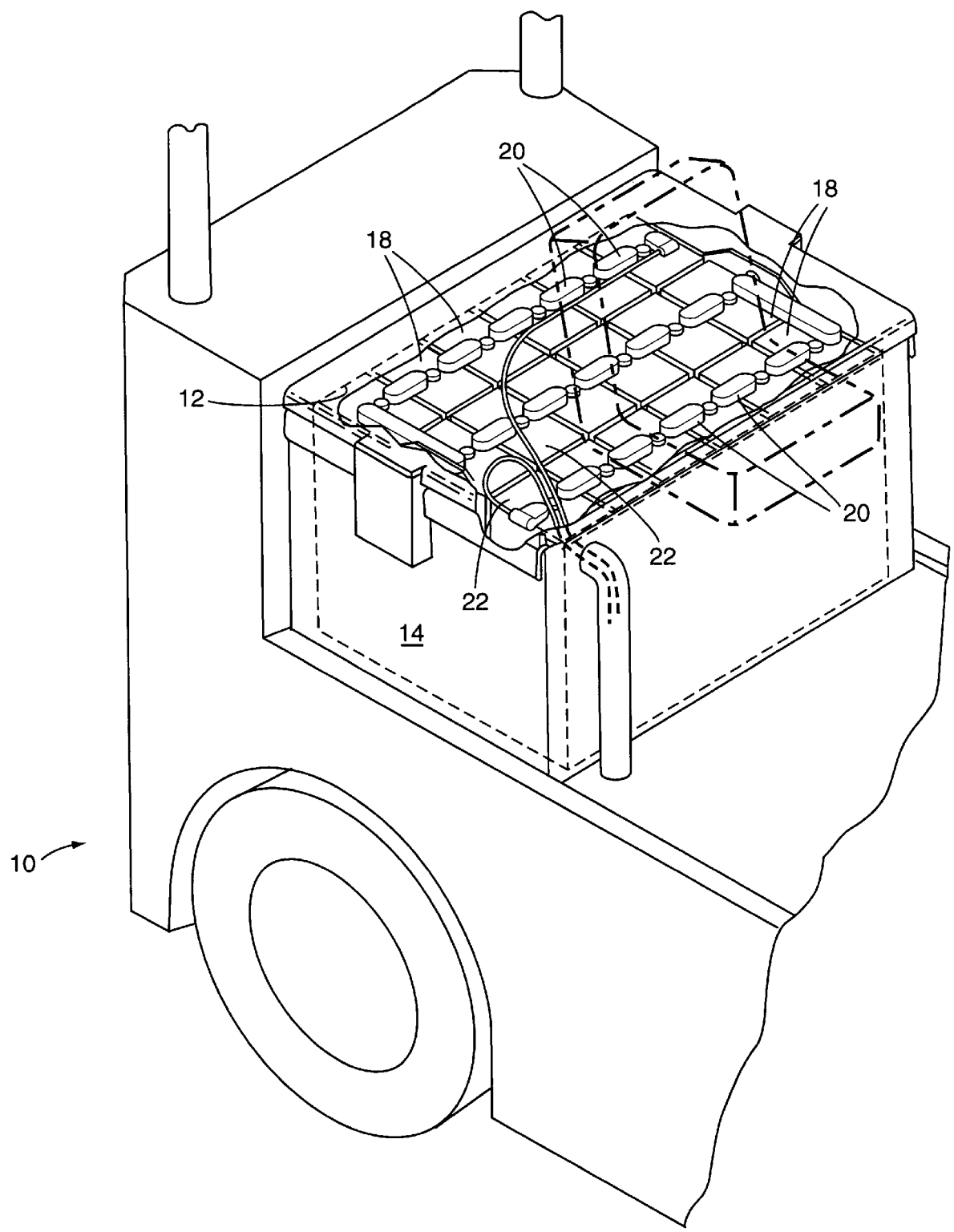
FIG. 2 is a partial isometric view of the rider truck shown in FIG. 1 and further illustrating the battery system.

Turning now to FIGS. 1 and 2, there is shown one embodiment of an application utilizing the present invention. Thus, an electric rider truck 10 has a battery 12 (FIG. 2) contained in a receptacle 14 generally under and rearward of the seat 16 of the truck.

Figure 3:
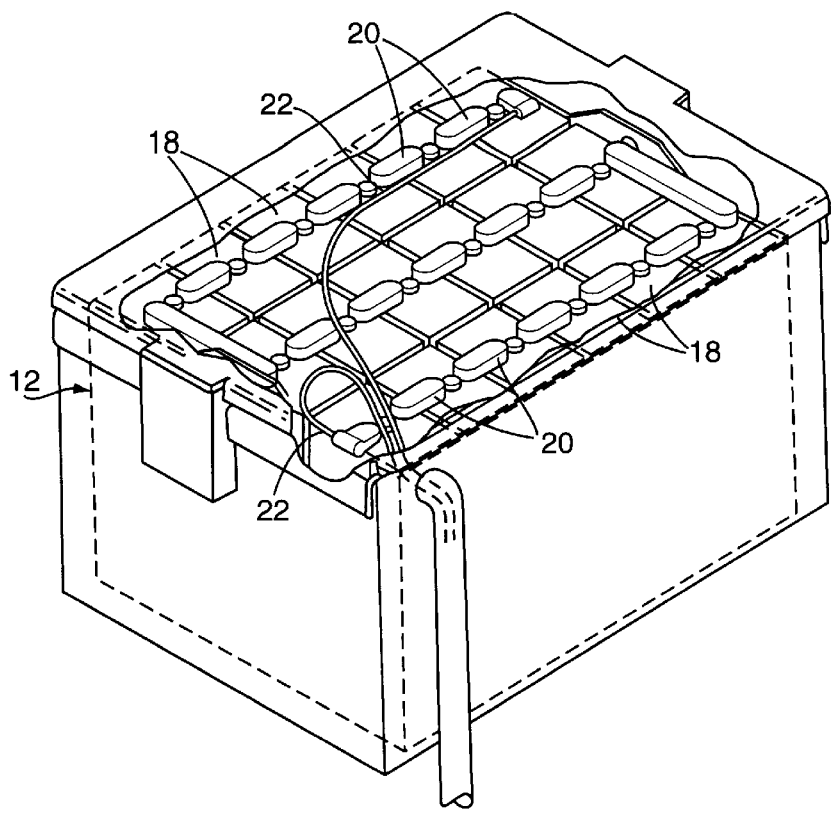
FIG. 3 is an isometric view of the battery system of the present invention with the cover of the enclosure partially broken away to show the cell-to-cell connections.

As seen in FIGS. 2 and 3, the battery 12 comprises a series of cells 18 wherein adjacent cells are electrically connected together utilizing capture molds 20, as will be described in detail hereinafter. The battery 12 is connected to the vehicle utilizing electrical connectors 22 (as shown in FIGS. 2 and 3).

In accordance with a principal aspect of the present invention, a capture mold is utilized to maintain the lead connector in the desired area while the post-connector fusion is being effected so as to connect the terminals of adjacent cells together. After the cell-to-cell connection has been effected, the capture mold stays with the battery, becoming a part of the resulting battery. In this fashion, both an efficient cell-to-cell connection is effected while the assembly operations required are minimized in comparison to the operations needed in prior techniques.

Figure 4:
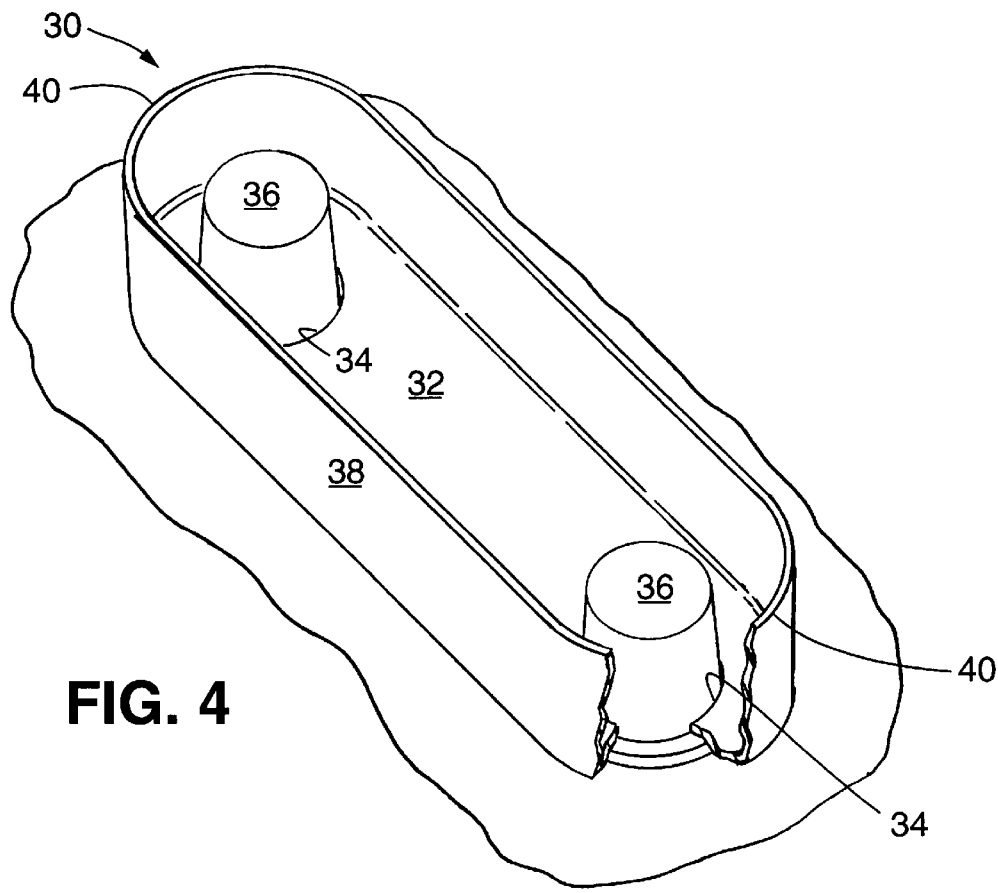
FIG. 4 is a partial isometric view and showing the capture mold utilized in the method of the present invention positioned over the terminal posts of adjacent cells.

To this end, and as is shown in FIG. 4, a capture mold 30 comprises a base 32 having apertures 34 sized to allow capture mold 30 to fit over terminals 36. The capture mold 30 also includes upstanding wall 38 which forms with the mold base 32 the shape of the connector which, after fusion or the like, effects the necessary electrical cell-to-cell connection, connecting the appropriate terminals 36 of adjacent cells 18.

In principal function, the capture mold 30 should have apertures 34 positioned inwardly from the mold ends indicated at 40 so that the connector extends outwardly from the terminal posts 36 to walls 40. The upstanding outside wall 38 of capture mold 30 should likewise have a height which extends to the height of terminals 36, and preferably somewhat higher, so as to allow an insulating shroud to cover the terminal posts. Additionally, the configuration of the capture mold 30 should allow an electrical connector to be made which, after fusion or the like, will satisfactorily carry the electrical current involved in the particular application.

Figure 5:
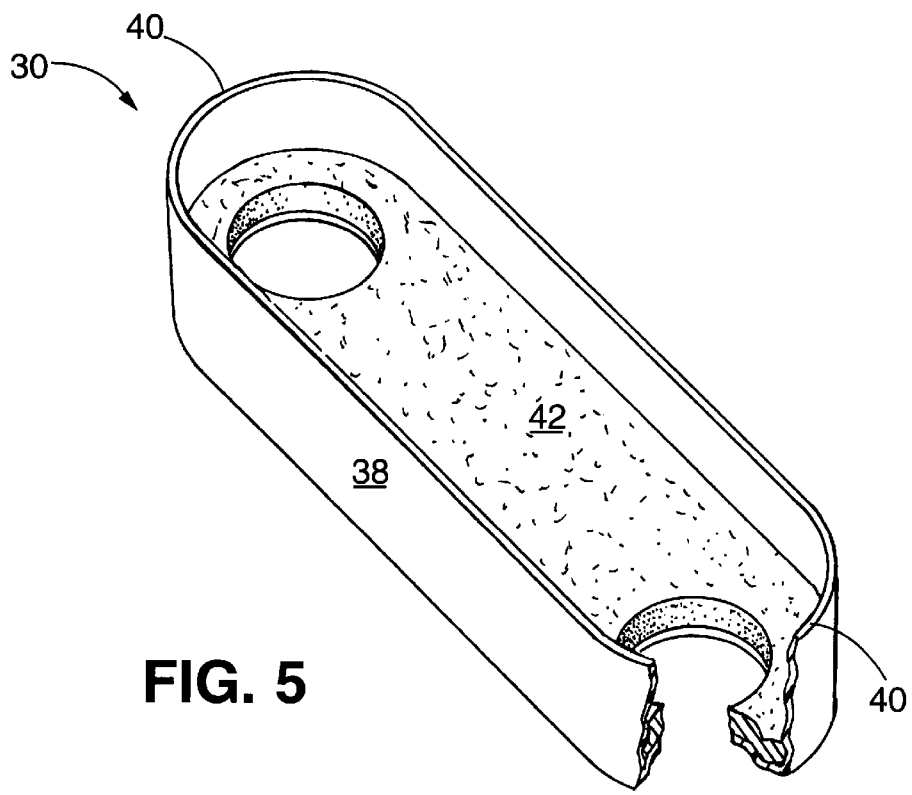
FIG. 5 is a partial isometric view showing the capture mold after the cell-to-cell connection has been made, the terminal posts being omitted for sake of illustration.

As is shown in FIG. 5, the capture mold 30 thus includes, after fusion, connector 42 which effectively connects the terminal post 36 of adjacent cells together (the terminal posts not being shown in FIG. 5). In accordance with this invention, electrical connector 42 can be made by any means desired; and the connection between the terminal post and connector 42 can be effected by fusion or any other method desired.

Thus, if desired, cell connector 42 can be precast and then placed into capture mold 30. Alternatively, capture mold 30 and cell connector 42 can be molded together as one piece.

A more preferred embodiment of this invention comprises either filling the capture mold 30 with molten lead or using a quantity of lead beads or shot which are retained in capture mold 30 and are then heated by induction heating or the like to form the cell connector 42.

The particular manner of utilizing induction heating or simply fusing the molten lead alloy to a terminal utilizing induction heating or other techniques are known and may be used as desired. What is important in the present invention is that the capture mold 30 serves as a retention area for the molten lead used for the connector, facilitating making the required connector while minimizing rundowns or the like during this operation. Even further, inasmuch as the capture mold 30 need not be removed, the cell-to-cell assembly operation to provide the resulting battery system is more amenable to automation and continuous production.

The lead connectors may be made from any of the conventional lead-based alloys used for connectors of this type. As illustrative examples, lead, or lead alloyed with tin, antimony and/or other alloying elements as is known, may be used.

As regards the capture mold, to be economical and practical, the material used should be inexpensive, relatively inert in sulfuric acid, and have relatively high impact strength. Molded rubber is one example of a satisfactory capture mold material.

Further, and unexpectedly, as previously referenced, relatively low melting point plastics, e.g., conventional lead-acid container materials (i.e., ethylene-propylene copolymers), have been found to be satisfactory despite the considerable disparity between the temperature of the molten conventional lead alloys and the melting point of such plastics.

Figure 6:
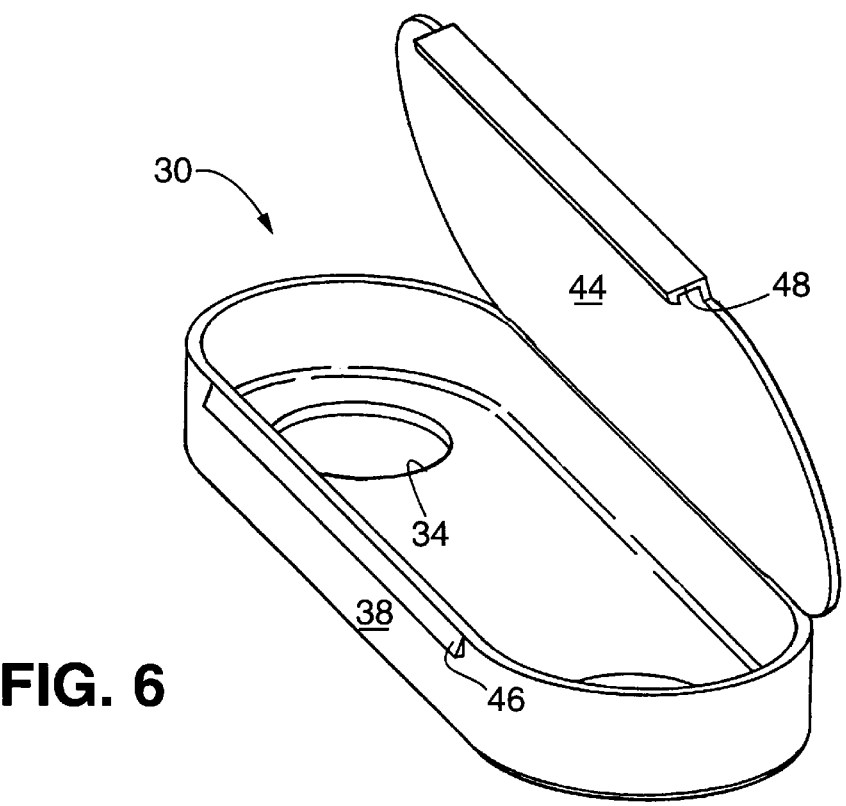
FIG. 6 is an isometric view showing a preferred embodiment of a capture mold having a hinged cover used as an insulating shroud when the battery system is in service.

Pursuant to a more preferred embodiment of the present invention, the capture mold 30 is provided with a hinged cover which can be used after the cell-to-cell connection is made as the insulating shroud for the connector. Thus, as is shown in FIG. 6, capture mold 30 includes hinged cover 44 which can be moved into a closed position and latched. In the illustrative embodiment, upstanding wall 38 thus has cover attachment structure 46 which retains cover 44 in its closed position after rotation of the cover over structure 46 with lip 48 being capable of being force fitted over cover attachment structure 46. In this fashion, the need for a separate insulating shroud is obviated, facilitating the assembly operation. When this more preferred embodiment is desired, it is preferred to utilize a polypropylene copolymer material, as used for lead-acid containers. Use of materials of this type thus provides a hinged cover that can be integrally molded or otherwise formed with the capture mold.

Thus, as has been seen, the present invention provides a facile method for making cell-to-cell connections, utilizing a mold which is designed to be retained in the assembled battery system. Not only is the making of the cell connector facilitated, but quality issues due to molten lead running down are minimized, if not eliminated. Also, and importantly, the cell-to-cell assembly is more amenable to automation in comparison to previously used techniques.

We claim:

1. A lead-acid battery system comprising a plurality of lead-acid cells or batteries adjacent to each other and each cell or battery having a container, a cover and a positive and a negative terminal post having a height standing above the cover, a non-conductive capture mold having holes allowing said mold to be inserted over the positive and negative terminal posts and located adjacent the cover, said capture mold having a base and upstanding walls having a height at least equal to the height of the terminal posts and a lead alloy connector positioned in said capture mold and being fused to the respective terminal posts upstanding in said capture mold.

2. The battery system of claim 1 wherein said capture mold is a plastic material.

3. The battery system of claim 2 wherein said plastic is a polypropylene polymer.

4. The battery system of claim 1 wherein said capture mold has a hinged cover capable of being moved to an open position to expose the upstanding terminal posts in the capture mold and a closed position covering said terminal posts.

5. A method of assembling a lead-acid battery system which comprises providing a plurality of lead-acid cells or batteries in a desired spatial relationship, each of said lead-acid cells or batteries having a container and a cover sealed thereto and a positive and a negative terminal post upstanding from the cover, placing a non-conductive capture mold adjacent the positive or negative terminal posts of adjacent cells, each of said capture molds comprising a base having holes allowing said capture mold to be placed over said terminal posts and positioned adjacent the cover of each of said cells or batteries, and having upstanding side walls having a height at least equal to the height of the terminal posts, and electrically connecting each set of positive or negative terminal posts located in each capture mold by a lead-based alloy connector fused to each set of terminals posts.

6. The method of claim 5 wherein the electrical connecting of each set of terminal posts is carried out by adding a quantity of lead alloy beads into each capture mold and heating using induction heating to form a molten lead alloy, and then ceasing the induction heating to allow the molten lead alloy to solidify to form the fused electrical connection.

7. The method of claim 5 wherein said capture mold has a hinged cover capable of being moved to an open position to expose the adjacent terminal posts and to allow the capture mold to be inserted over said terminal posts and positioned adjacent to said cover and a closed position covering said terminal posts.

* * * * *